United States Patent
Lucidarme (10) Patent No.: US 7,197,050 B2
(45) Date of Patent: Mar. 27, 2007

(54) UNIT FOR TRANSMITTING DATA BLOCKS IN ACKNOWLEDGED MODE ON A CHANNEL FEATURING A RADIO LINK WITH A MOBILE STATION

(75) Inventor: Thierry Lucidarme, Montigny-le-Bretonneux (FR)

(73) Assignee: Nortel Networks Limited, St. Laurent (CA)

( * ) Notice: Subject to any disclaimer, the term of this patent is extended or adjusted under 35 U.S.C. 154(b) by 1061 days.

(21) Appl. No.: 10/095,729

(22) Filed: Mar. 12, 2002

(65) Prior Publication Data
US 2002/0150064 A1  Oct. 17, 2002

(30) Foreign Application Priority Data
Mar. 16, 2001  (FR) ................... 01 03614

(51) Int. Cl.
*H04L 3/24* (2006.01)
(52) U.S. Cl. .............. 370/473; 370/465; 370/468; 370/470; 370/417; 714/701; 714/707; 714/774
(58) Field of Classification Search ............... None
See application file for complete search history.

(56) References Cited

U.S. PATENT DOCUMENTS

| | | | |
|---|---|---|---|
| 4,720,829 A * | 1/1988 | Fukasawa et al. ......... 714/701 |
| 5,602,831 A | 2/1997 | Gaskill | |
| 5,828,677 A * | 10/1998 | Sayeed et al. ............. 714/774 |
| 6,907,005 B1 * | 6/2005 | Dahlman et al. ......... 370/236 |

OTHER PUBLICATIONS

Patent Abstracts of Japan, vol. 2000, No. 06, Sep. 22, 2000 and Japan 2000 069037 (Nippon Telegr & AMP ; Teleph Corp & LT ; NTT>); Mar. 3, 2000.
ETSI TS 101 350 V8.5.0 (Aug. 2000), "Digital Cellular Telecommunications System (Phase 2+); General Packet Radio Service (GPRS); Overall Description of the GPRS Radio Interface; Stage 2 (GMS 03.64 version 8.5.0 Release 1999)".
ETSI EN 01 301 349 V8.3.1 (Oct. 2000), "Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol (GSM 04.60 Version 8.3.1 Release 1999)", pp. 70-105.

* cited by examiner

*Primary Examiner*—Chi Pham
*Assistant Examiner*—Raj K. Jain
(74) *Attorney, Agent, or Firm*—Trop, Pruner & Hu, P.C.

(57) ABSTRACT

The transmitting unit comprises means for obtaining a sequence of data blocks to be transmitted on a channel, means for receiving information acknowledging the blocks of the sequence from an addressee unit, and means for controlling the transmission of the blocks of the sequence on the channel on the basis of transmission-control information including the acknowledgement information received from the addressee unit, as well as an estimated quantity relating to a speed of movement of the mobile station.

7 Claims, 9 Drawing Sheets

UNIT FOR TRANSMITTING DATA BLOCKS IN ACKNOWLEDGED MODE ON A CHANNEL FEATURING A RADIO LINK WITH A MOBILE STATION

BACKGROUND OF THE INVENTION

The present invention relates to the use of techniques for packet transmission in acknowledged mode in radio communications systems.

The invention especially relates to the techniques which invoke automatic repetition of the packets or blocks for which the transmitter observes, according to acknowledgement information returned by the receiver, that they have not been correctly received (methods of ARQ (Automatic Repeat request) type).

The application of these techniques to mobile radio communications presents particular features because the errors affecting the blocks transmitted on the radio channel are not decorrelated. These errors are manifested by channel fades, having an average duration decreasing with the speed of the mobile station (Rayleigh fading). For a slow-moving mobile station, such channel fade typically lasts of the order of one to several hundred milliseconds.

An acknowledgement message returned by the addressee of the blocks, for example in response to a request from the transmitter (polling), usually relates to a series of transmitted blocks. When this series ends in a channel fade, the chances are high that one or more subsequent blocks have also been incorrectly received. The transmitter repeats the blocks for which it has been able to observe the incorrect reception, but it has to wait for the next acknowledgement message to be up to repeat these subsequent blocks. This wait leads to delays in the transmission of the blocks. The transmission delay, however, is often a critical problem in this type of system.

One object of the present invention is to propose an effective method of transmitting data in packet mode on radio links. Another object is to reduce the transmission delays which may result from the ARQ mechanisms employed in such systems.

SUMMARY OF THE INVENTION

The invention proposes a unit for transmitting data blocks on a communications channel featuring a radio link between two stations including a mobile station, comprising means for obtaining a sequence of data blocks to be transmitted on said channel, means for receiving acknowledgement information for the blocks of the sequence from an addressee unit, and means for controlling the transmission of the blocks of the sequence on the channel on the basis of transmission-control information including the acknowledgement information received from the addressee unit and a fade indicator derived from said acknowledgement information and from an estimated quantity relating to a speed of movement of the mobile station.

This unit takes into account the speed of the mobile station in the process of controlling the transmission of the blocks. This control may relate to the selection of the blocks to be repeated in an ARQ-type mechanism, or of other aspects such as the block-by-block selection of the level of protection against transmission errors used on the radio interface, for example.

The transmission-control means may, in particular, employ measures suitable for anticipating the incorrect reception of one or more blocks when the acknowledgement information received shows the start of a channel fade over a shorter duration than a typical fade duration corresponding to the speed of movement of the mobile station.

BRIEF DESCRIPTION OF THE DRAWINGS

By way of comparison.

DESCRIPTION OF PREFERRED EMBODIMENTS

The invention is described below in its application to GPRS (General Packet Radio Service) networks. These networks have been developed in order to allow packet mode data transmission in cellular networks of GSM (Global System for Mobile communications) type. As an illustration, the transmission of packets will be considered in the downlink direction, i.e. from the infrastructure of the network to the mobile stations. It will be understood, however, that the invention is applicable in both communications directions. It is applicable, moreover, to various other systems, in particular of UMTS (Universal Mobile Telecommunications System) type.

Figure 1:
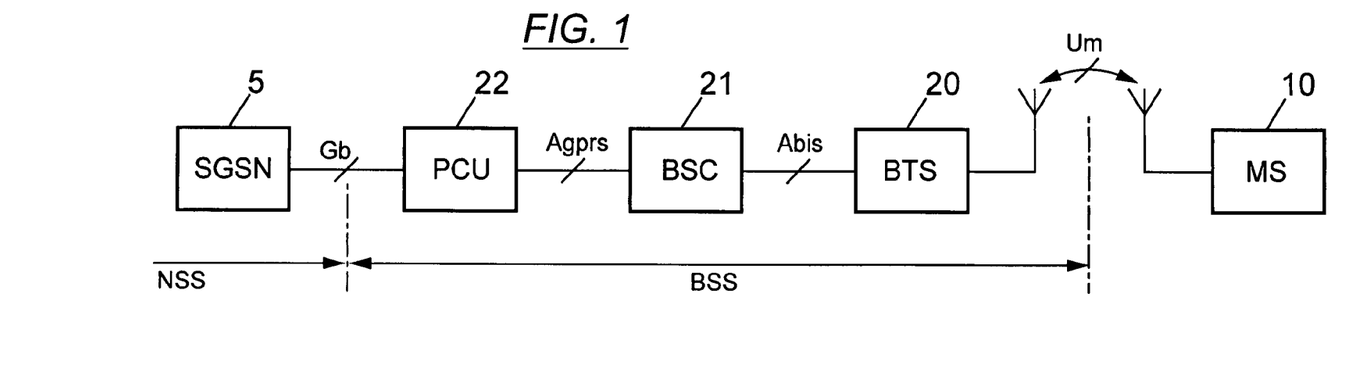
FIG. 1 is a diagram of a GPRS-type network to which the invention can be applied.

The GPRS network illustrated in FIG. 1 is built on a GSM infrastructure, and conventionally divided into a core network, also called Network and Switching Subsystem or NSS, and a radio access network also called base station subsystem or BSS.

For the packet service, the switches of the NSS are called GPRS support nodes or GSNs. A distinction is made between the SGSNs (Serving GSNs) 5 which are linked to the BSS through an interface called Gb, and the GGSNs (Gateway GSNs, not represented) which serve as a gateway with external packet transmission networks, such as the Internet, for example.

A general description of the radio interface, called Um, between the mobile stations (MS) 10 and the base stations (BTS) 20 of the BSS is provided in the technical specification ETSI TS 101 350, Digital cellular telecommunications system (Phase 2+); General Packet Radio Service (GPRS); Overall description of the GPRS radio interface; Stage 2 (GSM 03.64, version 8.5.0, Release 1999), published by the ETSI (European Telecommunications Standards Institute) in August 2000.

Each base station 20 is supervised by a base station controller or BSC 21 through an interface called Abis. To manage the transmission of GPRS packets, the BSS further comprises an entity 22 called packet control unit or PCU. The location of the PCU within the BSS is not standardized. In the example represented in FIG. 1, the PCU 22 is situated between the BSC 21, with which it communicates through an interface called Agprs, and the NSS, with which it communicates through the interface Gb.

Figure 2:
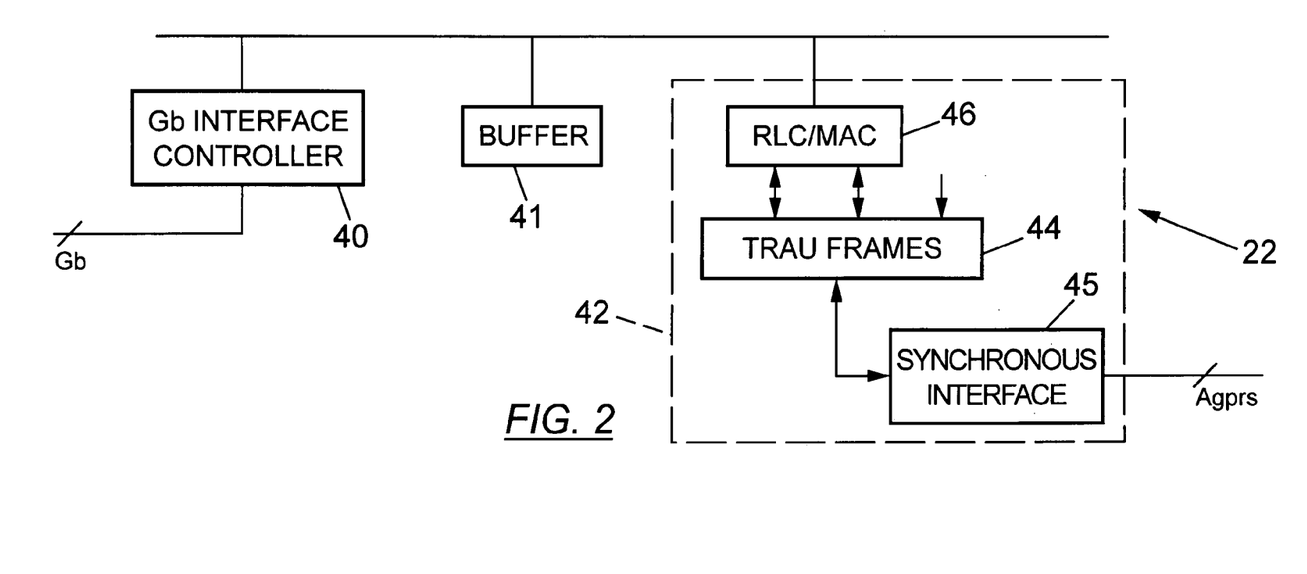
FIG. 2 is a block diagram of a packet control unit arranged for implementing the invention.

FIG. 2 illustrates a possible structure of a PCU 22 situated between an SGSN 5 and a BSC 21, as in the example of FIG. 1. The reference 40 designates the Gb interface controller for the link with the SGSN 5.

The Gb interface is of asynchronous type. It is based on the frame-relay (FR) protocol, as well as on a protocol called BSSGP (BSS GPRS Protocol) which transports routing and quality-of-service information between the BSS and the SGSN. The Gb interface controller 40 provides the physical link with the SGSN 5, as well as carrying out the procedures specific to the FR and BSSGP protocols.

The links between the PCU 22 and the BTSs 20 through the Agprs interface are of synchronous type. Consequently, the data manipulated by the PCU 22 between the Gb interface controller 40 and the Agprs interface controller 42 transit via a buffer memory 41 where packet queues are stored.

Between the PCU 22 and the BTS 20, the information is carried by 320-bit frames of TRAU (Transcoder/Rate Adapter Unit) type, at the rate of one frame every 20 ms. These TRAU frames are formatted and processed by a module 44 and transmitted by way of synchronous-interface circuits 45 which form MIC subchannels at 16 kbits with the BTSs 20. Several 16-kbit subchannels can be multiplexed on the Agprs interface and separated by the BSC 21 for routing to the BTSs. A module 46 of the Agprs interface controller 42 implements the radio protocols of layer 2 of the ISO model, i.e. the RLC/MAC (Radio Link Control/Medium Access Control) protocols described in the European Standard ETSI EN 301 349, Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60, version 8.3.1, Release 1999), published by ETSI in October 2000.

The RLC sublayer forms the interface with the upper-layer protocol, called LLC (Logical Link Control). It carries out the segmentation and the reassembling of the data units of the LLC protocol (LLC–PDU), which are exchanged asynchronously on the Gb interface. It produces RLC data blocks to which the MAC sublayer adds a one-byte MAC header.

In the down direction, from the PCU to the MSs, the MAC header of each RLC/MAC block includes:
- a three-bit USF (Uplink State Flag) field, serving to indicate which mobile station is authorized to use an uplink resource corresponding to the downlink resource on which the RLC/MAC block is transmitted;
- a three-bit acknowledgement control field, including a one-bit S/P (Supplementary/Polling) subfield indicating whether the acknowledgement-control field is active (S/P=1) or inactive (S/P=0) and a two-bit RRBP (Relative Reserved Block Period) subfield uniquely specifying an uplink block in which the addressed mobile station should transmit an acknowledgement message;
- a two-bit Payload Type field, specifying the type of RLC block following (data, control, etc).

It is the transmission of RLC data blocks which is of interest here. Each of these blocks includes an RLC header following the MAC header byte. This RLC header especially includes the following information:
- temporary flow identity (TFI), consisting of five bits identifying the temporary block flow (TBF), from which the RLC data of the block originate. A TBF is a connection supporting the unidirectional LLC–PDU transfer on physical data channels. A TBF is temporary, meaning that it is maintained only during the data transfer;
- a block sequence number BSN of SNS bits, which contains the sequence number of the RLC/MAC block in the TBF, modulo $2^{SNS}$, SNS being a predefined number.

The MAC sublayer further manages the multiplexing of the blocks pertaining to the various TBFs active on the available physical channels, arbitrating among the various mobile users by a scheduling mechanism.

The RLC/MAC entity of the mobile station which is the addressee of the downlink data blocks of a TBF keeps a reception-state variable V(R) up-to-date for this flow, which indicates the BSN following the highest BSN received on this TBF. The number V(R)–1 (modulo $2^{SNS}$) thus points to the end of a reception window, the length of which is WS RLC/MAC blocks. Upon receipt of a polling command, i.e. a block whose MAC header has the S/P bit equal to 1, the MS returns, in the uplink blocks specified by the RRBP subfield, a PDAN (Packet Downlink Ack/Nack) acknowledgement message which particularly includes:
- an SSN (Starting Sequence Number) field of SNS bits containing the current variable V(R) for the TBF;

and
- an RBB (Receive Block Bitmap) field representing a bitmap of WS bits indicating those blocks of the reception window which have been correctly received. A positive acknowledgement of the BSN=(SSN-i) mod $2^{SNS}$ block is indicated by the value 1 of the bit of rank i ($1 \leq i \leq k$) of the bitmap represented by RRB, and a negative acknowledgement by the value 0.

Upon receipt of the PDAN message, the PCU updates, for the TBF, an acknowledgement-state variable V(A) which contains the BSN of the oldest block which has not been positively acknowledged, as well as a table V(B) with WS entries indicating the acknowledgement states of WS consecutive blocks respectively from that designated by V(A), these WS consecutive blocks forming a transmission window. The possible acknowledgement states are: positive acknowledgement (ACK); negative acknowledgement (NACK), and acknowledgement not yet received (ACK_PENDING). The state variables V(A) and V(B) are deduced directly from the SSN and RBB fields received in the last PDAN message. The RLC/MAC protocol allows blocks to be transmitted only within the transmission window thus managed by the PCU. Outside this window, transmission of the blocks is inhibited.

In the case of GPRS, the standard specifies the values SNS=7, WS=64. A variable level of protection can be selected block by block within a TBF, by the choice of a coding scheme (CS) from among four schemes CS-1 to CS-4 specified in the European Standard ETSI EN 300 909, Digital cellular telecommunications system (Phase 2+); Channel coding (GSM 05.03, version 8.5.1, Release 1999), published by ETSI in November 2000.

Scheme CS-4 does not use any error-correction coding, i.e. the coding rate is equal to 1: only a block check sequence BCS is appended to the data blocks. Schemes CS-1 to CS-3 use a convolutional code of rate ½ after the addition of the BCS sequence. No puncturing is carried out in the CS-1 scheme (which offers the highest level of protection), while puncturing is applied in the CS-2 and CS-3 schemes so that they give rise to overall coding rates of about ⅔ and of about ¾, respectively.

The CS-i ($1 \leq i \leq 4$) channel coding is applied at the level of the physical layer protocol, i.e. in the BTSs in the downlink case. Each coded RLC/MAC block consists of 456 bits and is transmitted in corresponding timeslots of four TDMA (Time-Division Multiple Access) frames on a carrier frequency, the successive TDMA frames each being broken down into eight timeslots to provide for time-division channel multiplexing.

A pattern of eight signaling bits SB is inserted into each coded frame (two bits per timeslot) so as to indicate in particular which coding scheme has been applied by the transmitter.

These signaling bits are extracted from the coded block received by the addressee, to allow it to identify the coding scheme. The receiver then carries out the appropriate decoding of the block which will give rise to a positive acknowledgement if it is successful and if the decoded BCS is consistent with the content of the block.

The coding scheme applied to the downlink is determined in a way in which is known in itself by the PCU on the basis of measurements of reception quality on the radio link, according to link adaptation mechanisms which seek to achieve an target in terms of rate of error-affected blocks so as to optimize the raw throughput. The selected scheme is inserted into the TPAU frame carrying the block so as to be applied by the BTS.

The above-mentioned ETSI standards also specify an extension of the GPRS system, using EDGE (Enhanced Data for GSM Evolution) modulation. This extension is called EGPRS (EDGE–GPRS).

In a EGPRS system, the RLC/MAC layer uses SNS=11, and WS adjustable between 64 and 1024. The RLC and MAC headers are grouped together into a single RLC/MAC header which no longer has the "Payload Type" field and in which the S/P bit is replaced by a two-bit ES/P subfield making it possible to specify different acknowledgement formats when polling (ES/P≠00).

Nine modulation and coding schemes, called MCS-1 to MCS-9 are provided. The scheme used for a given block, as well as any puncturing scheme being applied, are indicated in a CPS (Coding and Puncturing Scheme indicator) field of the EGPRS RLC/MAC header.

The whole of the EGPRS RLC/MAC header is the subject of channel coding separate from that of the data of the block. The level of protection of this header against transmission errors is higher than that of the data, in order to ensure greater robustness of the signaling information.

Figure 3:
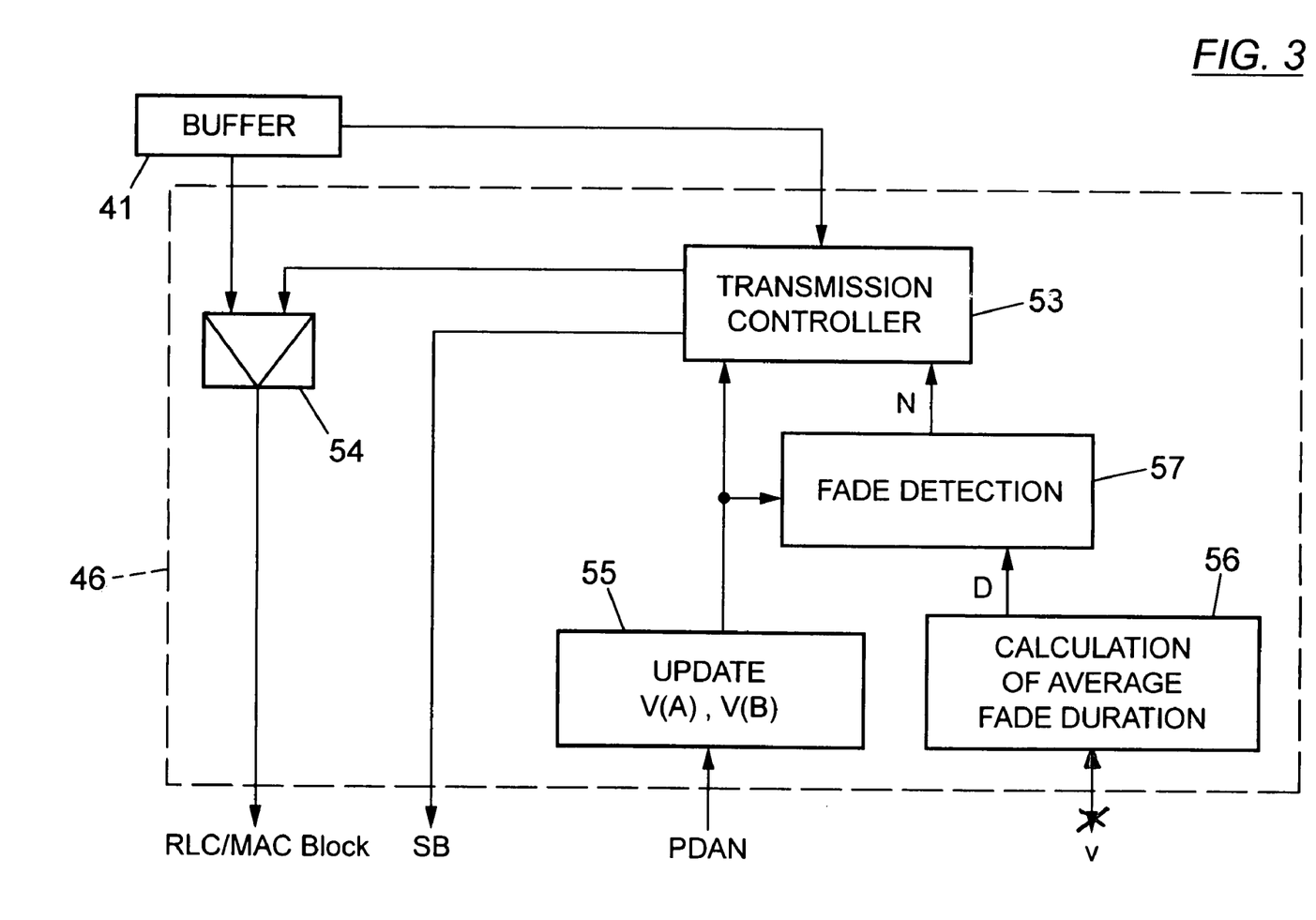
FIG. 3 is a block diagram of a transmitting unit according to the invention, forming part of a packet control unit according to FIG. 2.

FIG. 3 illustrates one possible organization of the RLC/MAC entity 46 of the PCU for a downlink TBF. The data of the LLC–PDU, which are segmented into RLC/MAC blocks, are kept in the buffer memory 41 until these blocks have been positively acknowledged. The transmission controller 53 particularly carries out the following functions:

selection of a TBF for each transmission period on the channel, via a known scheduling mechanism;

for the selected TBF, selection of an RLC/MAC block to be transmitted, especially on the basis of the state variables V(A) and V(B) and of the presence or absence of a new block in the queue relating to the TBF in the transmission buffer 41 (this selection of the RLC block to be transmitted will be explained in more detail with reference to FIG. 4);

selection of the coding schemes CS-i which the BTS 20 will apply to the block, and allocation of the corresponding value to the eight-bit signaling pattern SB. If the ARQ mechanism has led to selection of a block which has already been transmitted previously, the coding scheme adopted may be the same (GPRS case) or a more robust scheme (option in EGPRS). If the selected block is a new block, the coding scheme is determined by a conventional link adaptation mechanism;

if the selected block is a new block, extraction of a number of bits of information from the buffer 41, this number corresponding to the size defined for the coding scheme adopted; if not, new extraction of the data from the previously transmitted block;

determination of the content of the RLC/MAC header and control of the insertion of this header by the module 54. The controller 53 especially sets the TFI and BSN fields as well as the S/P-RRBP acknowledgement control field to poll the MS for acknowledgement. By way of illustration, it may poll every 12 blocks transmitted.

The RLC/MAC block delivered by the module 54 and the SB bits form part of the information placed in a TRAU frame transmitted to the BTS involved.

The module 55 represented in FIG. 3 handles the PDAN messages received from the addressee MS to update the state variables V(A) and V(B) of the TBF. The blocks of the TBF which were transmitted by the PCU after the polling block to which a PDAN message responds remain in the ACK-_PENDING state, while the other blocks which have been transmitted up to this polling block are set to the ACK or NACK state depending on the value of the corresponding bit of the RBB bitmap (in EGPRS, this RBB bitmap can be transmitted in compressed form, and then has to be decoded correspondingly by the module 55).

In accordance with the invention, the control of the transmission of the blocks on a TBF also depends on an estimation of the speed of movement v of the mobile station in question. More generally, any parameter, measured or estimated, relating to this speed of movement can be used.

By way of example, the speed v can be estimated in a way which is known in itself by analyzing the time variations of the radio signal power received by the BTS 20 from the MS 10 (or in the opposite direction by the MS 10 from the BTS 20). One possible example of an estimation method is described in FR–A–2 782 227. The speed estimates arrive at the PCU 22 in uplink TRAU frames.

The PCU comprises a module 56 which determines a typical fade duration D on the basis of the estimated speed v. This duration D may especially be an average fade duration which can be calculated as the width of the peak of the correlation function of the Rayleigh-fading statistical process according to a given modeling, for example the Jakes model. The values of the duration D as a function of v can be calculated once and for all and stored in memory in a look-up table of the module 56. These values of D are advantageously expressed as integer numbers of transmitted blocks, knowing that there is typically one block every 20 ms per TBF.

By way of example, for transmission on a carrier frequency at 900 MHz and a mobile station which is moving at 1 km/h, the average duration of a fade of more than 20 dB by comparison with the root-mean-square (RMS) value is about 130 ms, and D can be taken to be equal to 6.

A fade detection module 57 of the RLC/MAC entity examines the PDAN messages (or the state variables V(A) and V(B) which are deduced therefrom by the module 55) in order to detect certain fades of the radio channel on the basis of the negatively-acknowledged blocks. The fades thus detected are those which span one or more consecutive blocks transmitted at the end of the polling period, which ends with the polling block to which the PDAN message responds, and having a detected duration less than D. There is a strong chance that one or more subsequent blocks, transmitted just after this polling block, have also experienced the fading conditions. In order to increase this probability, the module 56 can adopt a duration D slightly reduced by comparison with the calculated average (for example D=5 in the preceding numerical example).

In the example represented, the output of the detection module 57 after reception of a PDAN message is a number N estimating the number of blocks in the ACK_PENDING state which have been transmitted just after the polling block, probably experiencing fading conditions detected according to this PDAN message.

In other words, if the module 57 detects, just after the end of the polling period, a fade spanning M blocks, with M<D, then it takes N=D−M. Otherwise, it takes N=0.

In EGPRS, it was seen that the RLC/MAC header is better protected than the data of the RLC block. In general, the content of the header resists the fading conditions, so that, even if the block which carries the polling command (S/P=1 or ES/P≠00) is acknowledged negatively, this command can be obtained and processed by the MS. The detection by the module 57 of a fade spanning M EGPRS blocks up to the end of the polling period then results from the observation of M consecutive blocks in the NACK state in V(B).

In GPRS, it is not possible to protect the S/P–RRBP acknowledgement-control field better than the data of a block. However, the controller 53 can select the applied coding scheme CS-i block by block. The process is advantageously as follows. Every time a coding scheme other than CS-1 is determined by the link adaptation mechanisms, the controller 53 selects a scheme which is more robust to errors for each block, the MAC header of which has the S/P bit equal to 1. In particular, the scheme CS-1 (maximum protection level) can be adopted systematically for these polling blocks. In this case, the detection by the module 57 of a fade applying to M GPRS blocks up to the end of the polling period results from the observation of M-1 consecutive blocks in the NACK state in V(B) followed by a block in the ACK state corresponding to the polling block transmitted more robustly.

Figure 4:
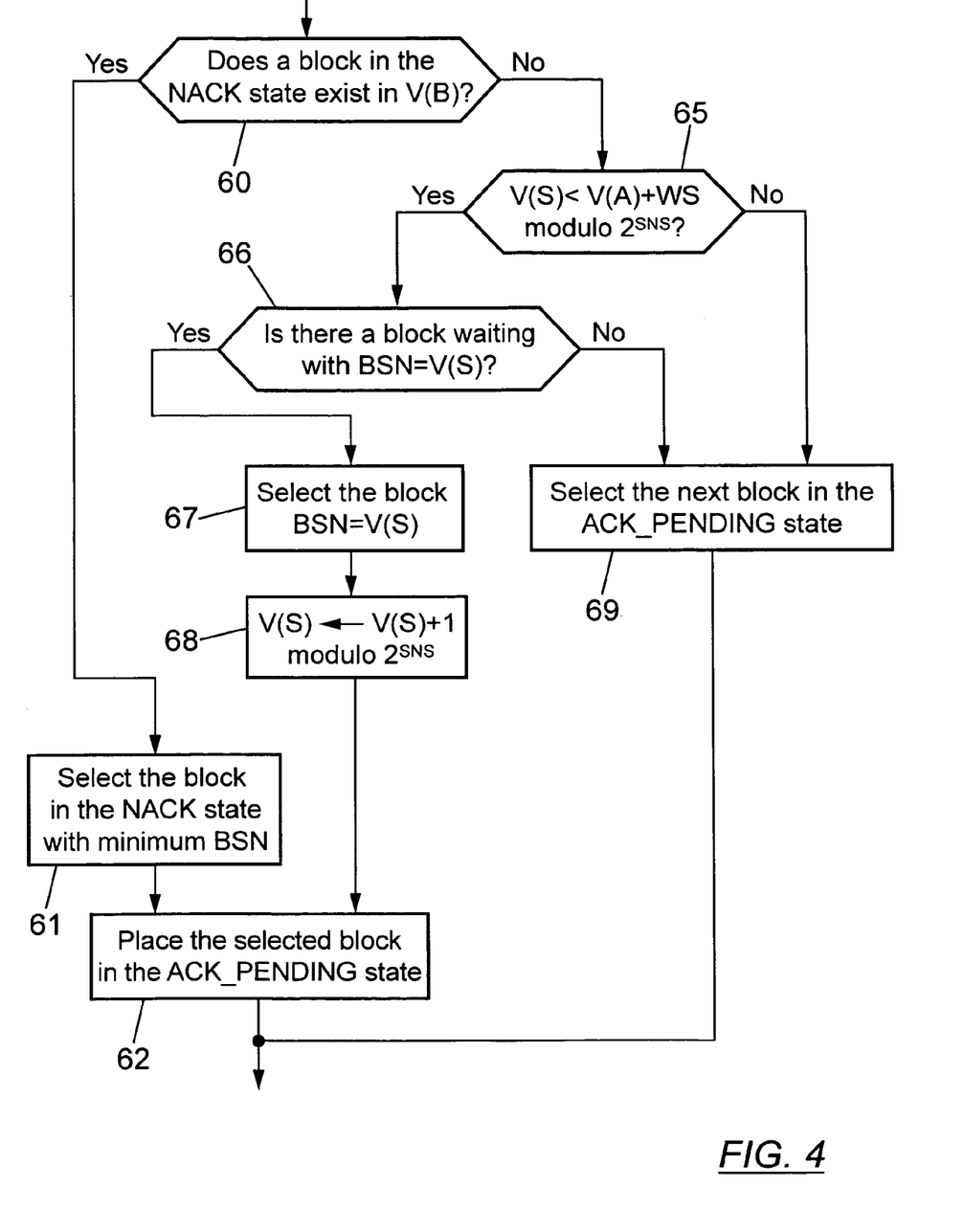
FIG. 4 is a flow chart of a block-transmission control procedure by a transmission unit according to the invention.

FIG. 4 shows a procedure applicable by the controller 53 for controlling the transmission of a block of a TBF which has been selected by the transmission-scheduling process, in accordance with the RLC protocol. The controller first of all examines the table V(B) in order to determine whether it designates one or more blocks in the NACK state (test 60). If so, the block in the NACK state having the smallest sequence number BSN is selected at stage 61 in order to be repeated, and this block is then passed to the ACK_PENDING state in table V(B) at stage 62.

In the absence of a negatively-acknowledged block (no block in the NACK state at test 60), the controller 53 performs the following operations:

if $V(S)<V(A)+WS$ modulo $2^{SNS}$ (test 65), it examines whether there is a block in the transmission buffer 41 awaiting the current TBF with BSN=V(S) (test 66). The variable V(S) represents the sequence number of the "new" block to be transmitted, having the minimum BSN number of which is a (initialized at 0, like the BSN, at the start of the TBF);

if this block BSN=V(S) is awaiting transmission, it is selected at stage 67 then passed to the ACK_PENDING state in the table V(B) at stage 62, after incrementation of the variable V(S) (stage 68) by one unit, modulo if the block BSN =V(S) is not yet in the transmission buffer 41, the block selected at stage 69 is the next block in the ACK_PENDING state. This "next block" is the oldest block (minimum BSN) for which the value in the table V(B) indicates the ACK_PENDING state, then the next one, etc.

if $V(S)=V(A)+WS$ modulo $2^{SNS}$ in test 65, the transmission window is blocked ("stalling"): any block awaiting with BSN=V(S) cannot be transmitted, and the controller passes to the above-mentioned stage 69 to select the next block in the ACK_PENDING state.

When N>0 on conclusion of the processing carried out by the modules 55 and 57 according to a PDAN message responding to a given polling block, the controller 53 takes into account a fade, the start of which was detected by the module 57. It determines whether the N blocks, transmitted in the N transmission periods allocated to the TBF after the polling block to which the PDAN message responded which gave rise to this value N>0, have already been transmitted at least one further time after these N transmission periods. Each state variable of the table V(B) which corresponds to one of these N blocks which has not been retransmitted is passed from the ACK_PENDING state to the NACK state. This has the effect of forcing blind repetition of these probably incorrectly received blocks (stage 69). This blind repetition takes place just after the repetition of the block or blocks which have actually been negatively acknowledged.

In EGPRS, the controller 53 may moreover, for each of these repetitions of stage 69 (blind or otherwise) select a level of protection against transmission errors which is higher than that resulting from the general link adaptation mechanisms, so as to increase the probability of correct reception of the repeated block. Another possibility is to send, by way of repetition of this block, incremental redundancy according to a known, hybrid ARQ mechanism.

In an alternative embodiment of the invention, the typical fade duration D, which is related to the speed v, can be estimated directly by a statistical average of the fade durations, in terms of numbers of blocks, observed according to the negative acknowledgements sent back in the PDAN messages.

Figure 5:
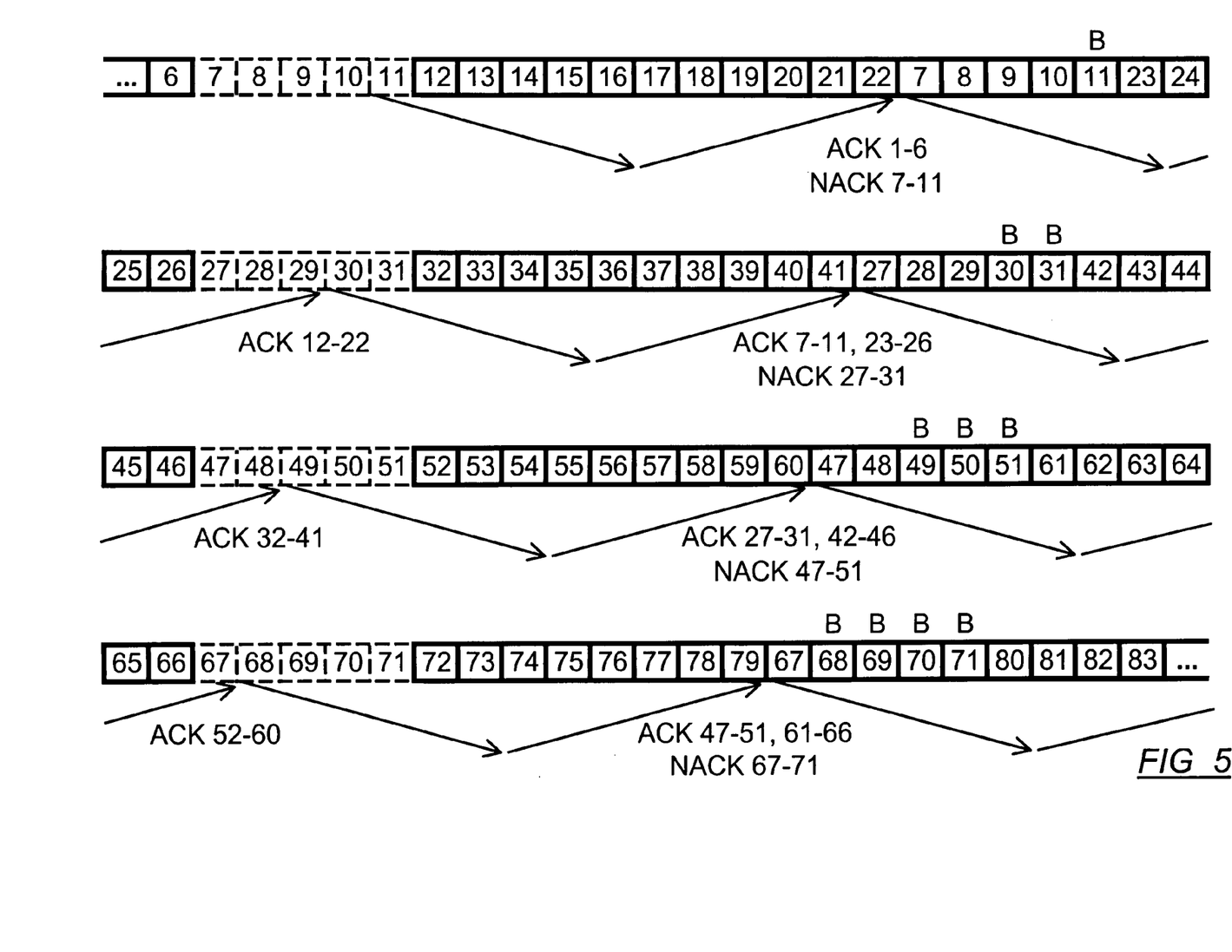
FIGS. 5, 7 and 9 are diagrams illustrating examples of transmission of blocks of a sequence by a transmission unit according to the invention.
Figure 6:
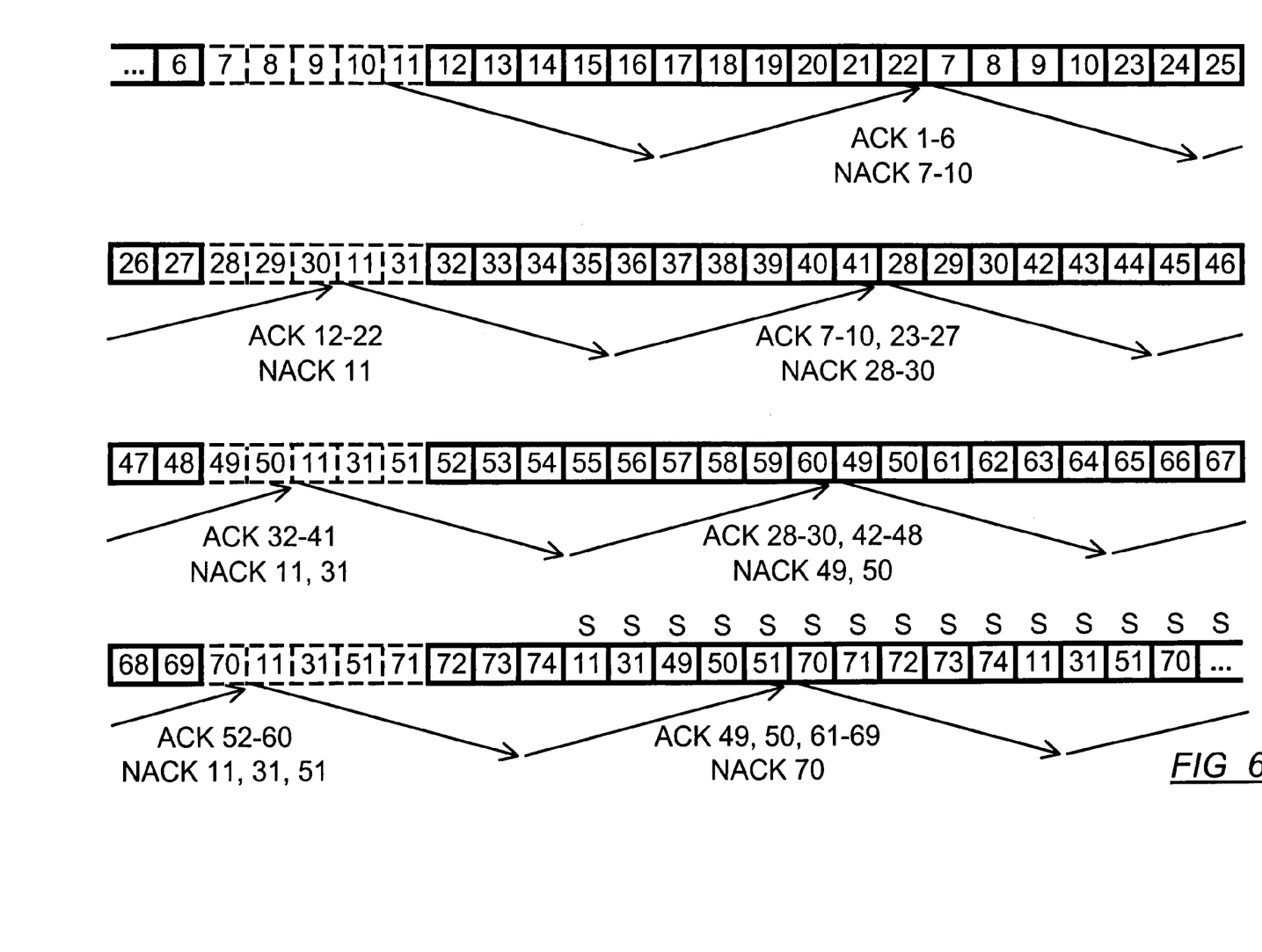
FIGS. 6, 8 and 10 are diagrams corresponding respectively to those of FIGS. 5, 7 and 9 but without the application of the invention.
Figure 7:
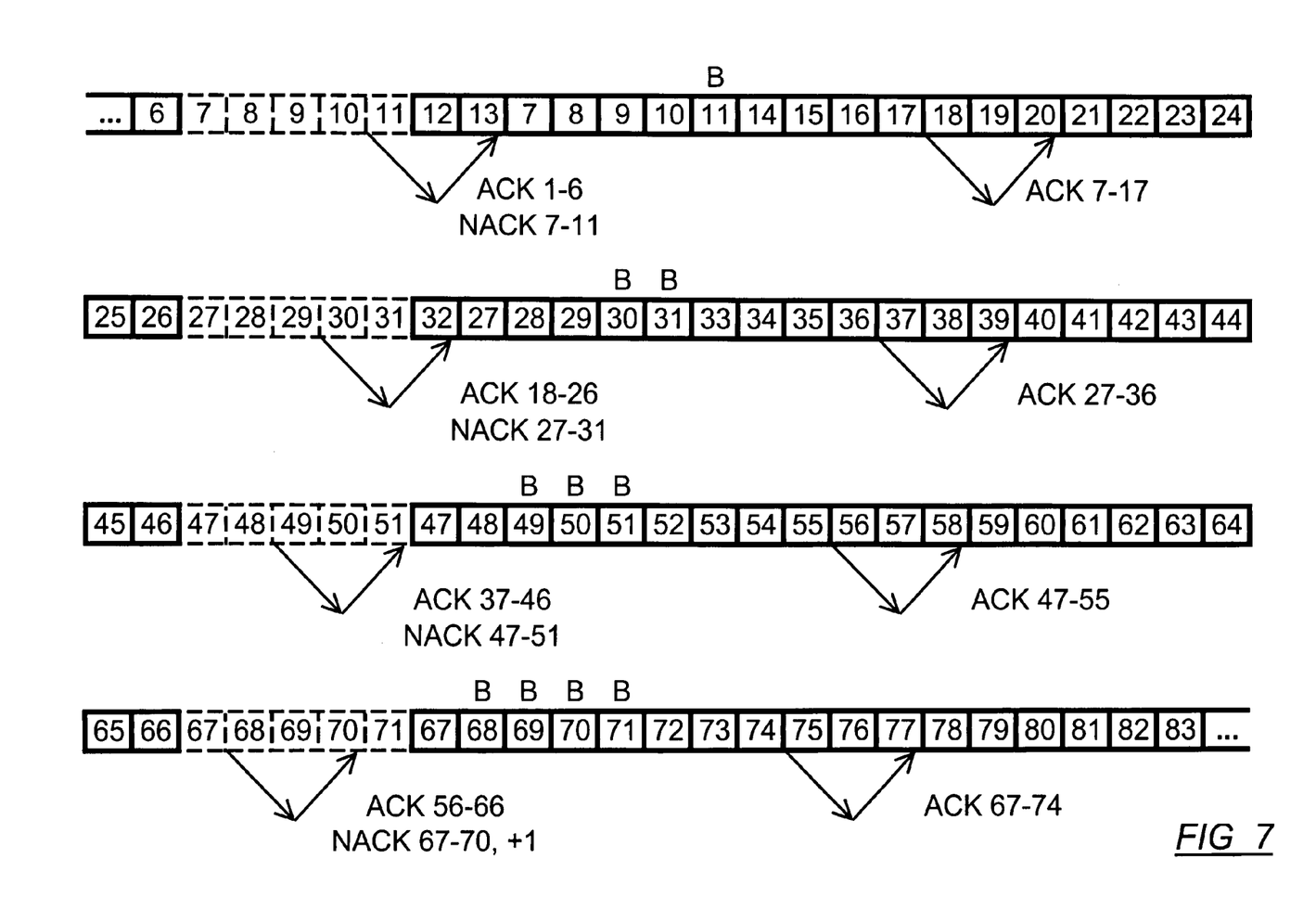
Figure 8:
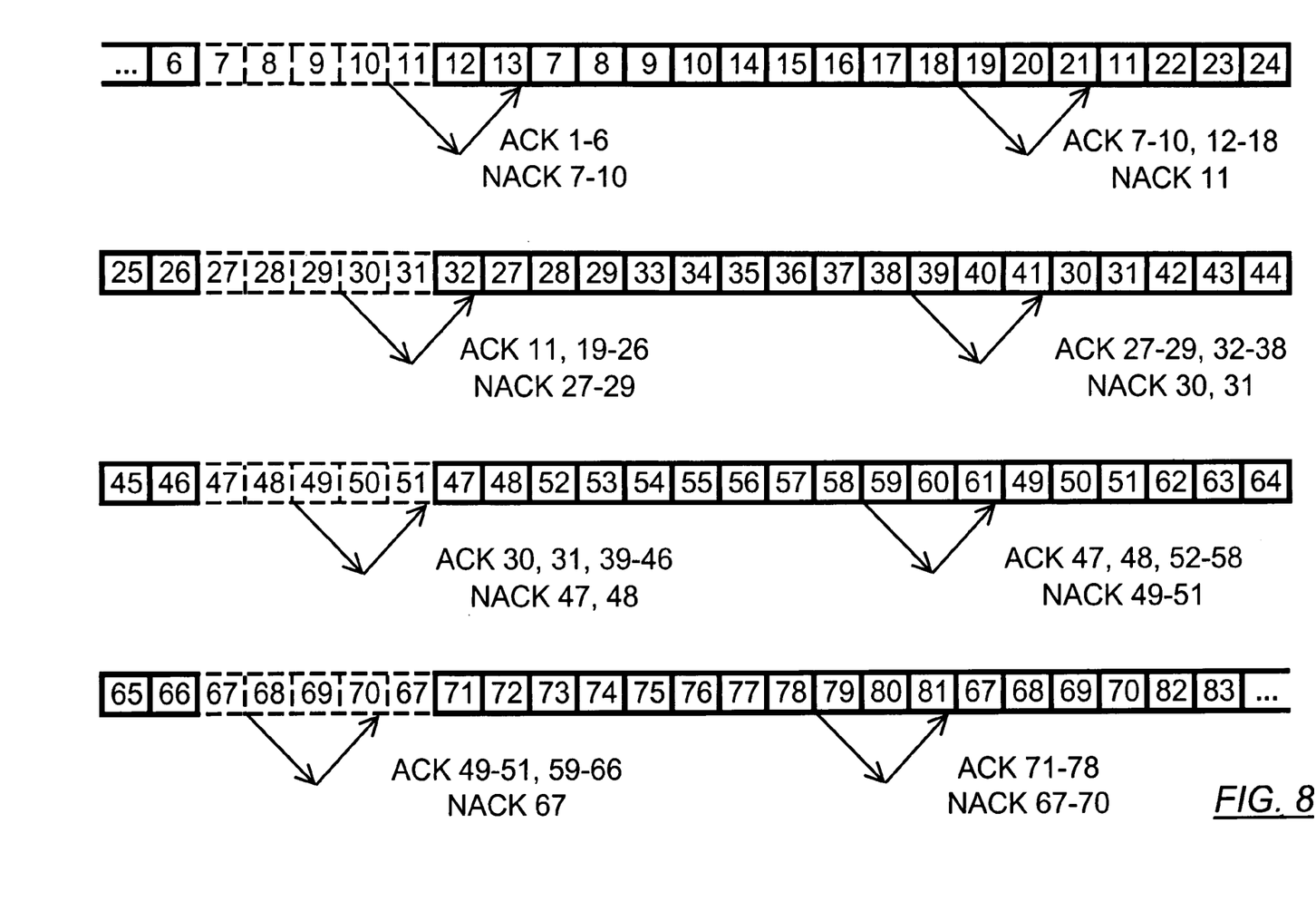
Figure 9:
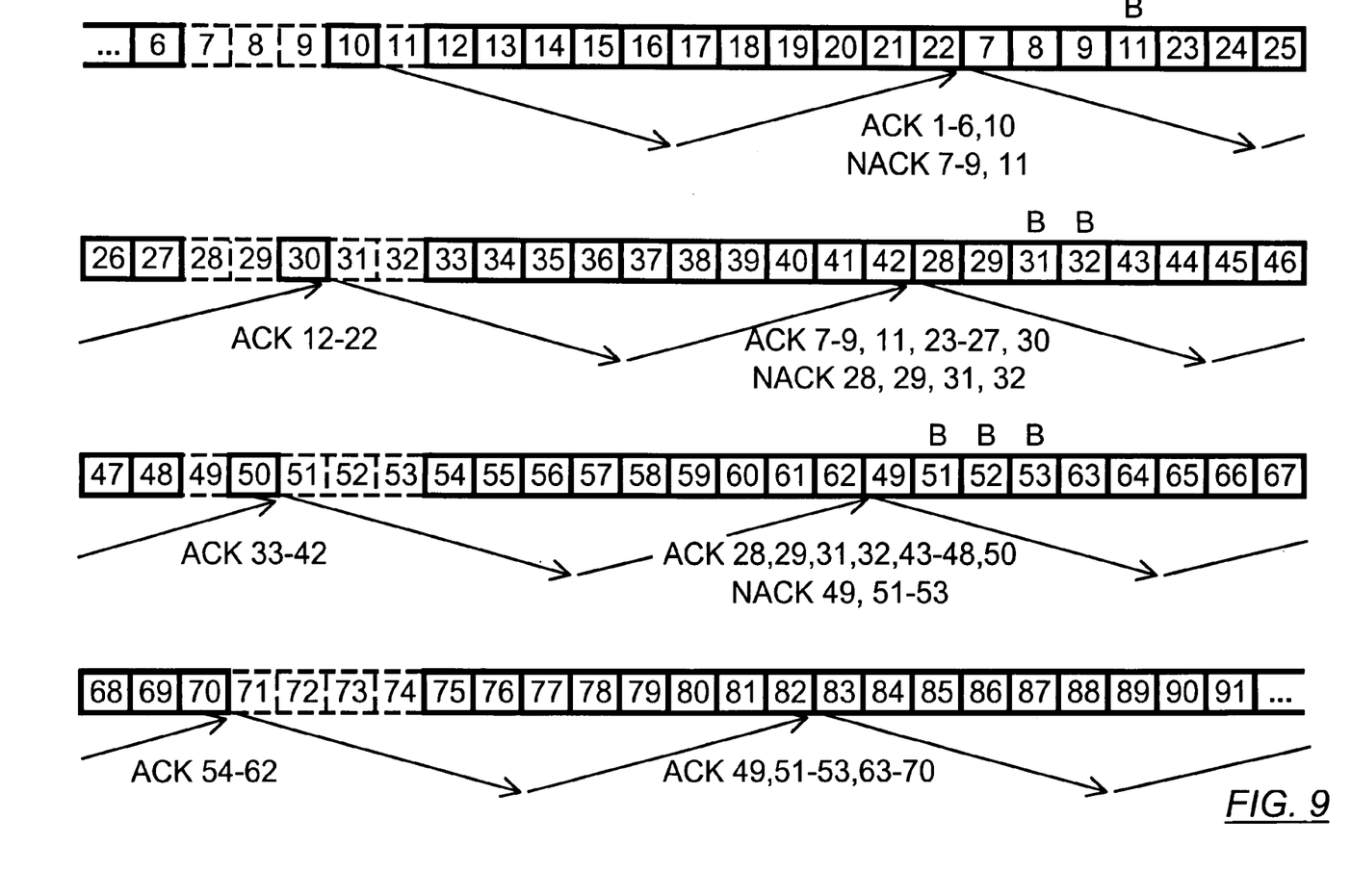

FIGS. 5 to 10 illustrate how the speed information is taken into account in the block transmission control on a TBF. The numbers on the drawings are the BSNs of the blocks. Each diagram corresponds to a case in which the PCU activates the acknowledgement-control field (down arrows) every 12 blocks. In each diagram, the blocks represented in dashed lines are negatively acknowledged (they were transmitted during a channel fade). The same sequence of fades has been taken into account on the six figures, and it is assumed, in order better to show the advantages obtained, that each of these fades has the duration D=5 adopted by the module 56. The up arrows represent the PDAN messages responding to the polling blocks. Beside each of these up arrows the blocks of the transmission window, which are in the ACK and NACK states respectively after a PDAN message has been taken into account (the blocks not specified are in the ACK_PENDING state), have been indicated. FIGS. 5, 7 and 9 correspond to the implementation of the invention and are to be compared with FIGS. 6, 8 and 10 respectively corresponding to the implementation of the same method without the speed information being taken into account.

The example of FIGS. 5 and 6 is an EGPRS case: the PDAN message can be derived and returned to the PCU although the data of the polling block to which it responds are negatively acknowledged. It has been assumed that the round trip time between the transmission of a polling block by the PCU and its reception of the PDAN message responding to it corresponds to a period of about 12 blocks (typical value in the case where the PCU is collocated with the SGSN). The label "B" in FIG. 5 represents the blocks retransmitted blindly by the PCU, because they have been artificially placed in the NACK state in response to the detection of the start of a fade. It is seen that these blocks retransmitted blindly appreciably reduce the transmission delay on the TBF by comparison with the conventional method illustrated by FIG. 6. In the example given, the conventional method further leads to window stalling (blocks labeled "S", repeated in the ACK_PENDING state according to stage 69 until positive acknowledgement of the block BSN=11), which it is possible to avoid by taking account of the speed information (case WS=64).

The example of FIGS. 7 and 8 is also an EGPRS case, with a round-trip time of about three blocks (typical value in the case where the PCU is collocated with the BTS). A reduction will also be observed in the transmission delays (for example, the block BSN 30 is received ten blocks earlier, i.e. about 200 milliseconds, in FIG. 7 than in FIG. 8). In this example, the typical fade duration D is longer than the round trip time. It is therefore possible (last rows of FIGS. 7 and 8) that a fade, the start of which is detected upon reception of a PDAN message, extends over one or more blocks beyond this reception. When that occurs, the controller 53 delays the repetition of the blocks in the NACK state until expiry of the duration D from the detected start of fade. If a block is transmitted before this expiry (the block BSN=71 in the example of FIG. 7), the controller 53 keeps it in the NACK state so that it can be retransmitted without waiting for reception and processing of the next PDAN message. Alternatively, the controller 53 does not keep this block 71 in the NACK state after its first transmission, but it chooses, for this first transmission, a coding scheme which is more robust to errors than that applied to the other blocks of the TBF, to anticipate difficult propagation conditions owing to the speed information.

Figure 10:
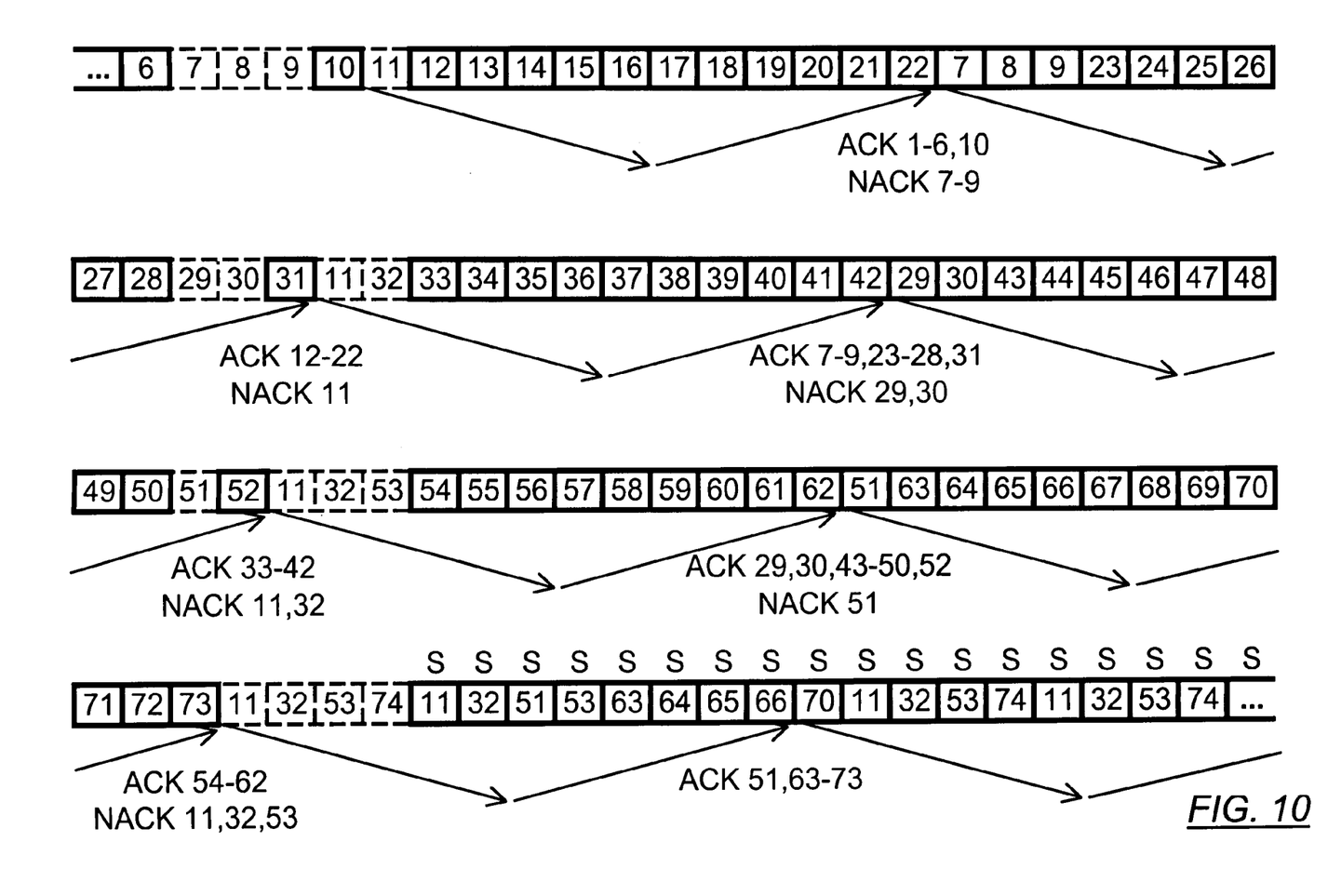

The example of FIGS. 9 and 10 is a GPRS case, with a round trip time of about 12 blocks. It can be seen that, in this case too, taking account of the speed information reduces the transmission delay on the TBF and reduces the probability of window stalling.

The invention claimed is:

1. A transmitting unit for transmitting data blocks on a communications channel featuring a radio link between two stations including a mobile station, comprising:
   means for obtaining a sequence of data blocks to be transmitted on said channel;
   means for receiving acknowledgement information for the blocks of the sequence from an addressee unit; and
   means for controlling transmission of the blocks of the sequence on the channel on the basis of transmission control information including the acknowledgement information received from the addressee unit and a fade indicator derived from said acknowledgement information and from an estimated quantity relating to a speed of movement of the mobile station,
   wherein the control means comprises means for determining a channel fade duration as a function of said estimated quantity relating to the speed of the mobile station, and means for detecting channel fades each covering one or more blocks transmitted consecutively, the start and the end of a fade being detected on the basis of the acknowledgement information received from the addressee unit, and wherein the control means are arranged to control the transmission of the blocks by taking account of each fade detected over a duration less than the determined channel fade duration, whose start was detected after the reception of acknowledgement information but whose end has not yet been detected.

2. A transmitting unit for transmitting data blocks on a communications channel featuring a radio link between two stations including a mobile station, comprising:
   means for obtaining a sequence of data blocks to be transmitted on said channel;
   means for receiving acknowledgement information for the blocks of the sequence from an addressee unit; and
   means for controlling transmission of the blocks of the sequence on the channel on the basis of transmission control information including the acknowledgement information received from the addressee unit and a fade indicator derived from said acknowledgement information and from an estimated quantity relating to a speed of movement of the mobile station,
   wherein the control means comprises means for selecting blocks of the sequence to be respectively transmitted on the channel in transmission periods successively allocated to the addressee unit, the block selected for a transmission period being a function of acknowledgement information received from the addressee unit and of said estimated quantity relating to the speed of the mobile station; and
   further comprising means for intermittent activation of an acknowledgement-control field provided in a header of each block transmitted on the channel, to require an acknowledgement of blocks on the part of the addressee unit, wherein the control means comprises means for processing the acknowledgement information received from the addressee unit in response to the reception of a block having the acknowledgement-control field activated, to assign a first state to the blocks of the sequence which are acknowledged by the addressee unit, a second state to the unacknowledged blocks of the sequence which have not been transmitted alter said block having the acknowledgement-control field activated, and a third state to the unacknowledged blocks of the sequence which were transmitted after said block having the acknowledgement-control field activated, and wherein the block-selection means are arranged to select a block of the sequence for each transmission period allocated to the addressee unit on the basis of the states respectively assigned to the blocks previously transmitted on the channel and of said estimated quantity relating to the speed of the mobile station.

3. Transmitting unit, according to claim 2, wherein the control means comprises means for determining a channel fade duration as a function of said estimated quantity relating to the speed of the mobile station, and means for detecting channel fades each covering one or more blocks transmitted consecutively, the start and the end of a fade being detected on the basis of the acknowledgement information received from the addressee unit, and wherein the control means are arranged to control the transmission of the blocks by taking account of each fade detected ova a duration less than to determined typical duration, whose start was detected after the reception of acknowledgement information but whole end has not yet been detected, and wherein, in response to detection of a fade over a duration less than the determined channel fade duration, whose start was detected after the reception of acknowledgement information responding to the reception of a block having the acknowledgement-control field activated but whose end has not been detected, the control means are arranged to assign the second state to at least one unacknowledged block of to sequence which was transmitted after said block having the acknowledgement-control field activated and before the determined typical duration has elapsed from the start of the fade detected.

4. Transmitting unit according to claim 3, wherein a stronger level of channel coding against transmission errors is applied to the acknowledgement-control field than to at least a part of to data of each block.

5. Transmitting unit according to claim 3, wherein a stronger level of channel coding against transmission errors is applied to the blocks having the acknowledgement-control field activated than to to blocks not having the acknowledgement-control field activated.

6. A transmitting unit for transmitting data blocks on a communications channel featuring a radio link between two stations including a mobile station, comprising:

means for obtaining a sequence of data blocks to be transmitted on said channel;

means for receiving acknowledgement information for the blocks of the sequence from an addressee unit; and     means for controlling transmission of the blocks of the sequence on the channel on the basis of transmission control information including the acknowledgement information received from the addressee unit and a fade indicator derived from said acknowledgement information and from an estimated quantity relating to a speed of movement of the mobile station,     wherein the control means comprises means for selecting a level of protection against errors for the transmission of each block of the sequence to be transmitted respectively on the channel in transmission periods successively allocated to the addressee unit, the level of protection selected for a transmission period being a function of the acknowledgement information received from the addressee unit and of said estimated quantity relating to the speed of the mobile station.

7. Transmitting unit according to claim 6, wherein the level of protection against the errors comprise adjustable-rate channel coding to which the blocks are subjected.

* * * * *

UNITED STATES PATENT AND TRADEMARK OFFICE
CERTIFICATE OF CORRECTION

PATENT NO.         : 7,197,050 B2
APPLICATION NO. : 10/095729
DATED              : March 27, 2007
INVENTOR(S)        : Thierry Lucidarme It is certified that error appears in the above-identified patent and that said Letters Patent is hereby corrected as shown below:

Column 10:
Line 38, "alter" should be --after--;
Line 58, "ova" should be --over--;
Line 59, "to" should be --the--;
Line 61, "whole" should be --whose--.

Column 11:
Line 1, "of to" should be --of the--;
Line 9, "to" should be --the--;
Line 13, "to to" should be --to the--.

Signed and Sealed this

Fifth Day of June, 2007

JON W. DUDAS
*Director of the United States Patent and Trademark Office*